United States Patent
Bohizic et al.

(10) Patent No.: US 6,357,020 B1
(45) Date of Patent: Mar. 12, 2002

(54) METHOD AND SYSTEM FOR LOW LEVEL TESTING OF CENTRAL ELECTRONICS COMPLEX HARDWARE USING TEST NANO KERNEL

(75) Inventors: Theodore Joseph Bohizic, Hyde Park, NY (US); Shakti Kapoor, Austin; Walid M. Kobrosly, Round Rock, both of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/241,108

(22) Filed: Feb. 1, 1999

(51) Int. Cl.[7] ........................ G06F 11/00; G06F 11/22
(52) U.S. Cl. ........................... 714/39; 714/25
(58) Field of Search ................. 714/41, 42, 32, 714/39, 25, 736, 28, 33; 703/14, 15, 21; 370/402

(56) References Cited

U.S. PATENT DOCUMENTS

| | | | |
|---|---|---|---|
| 4,493,078 A | * | 1/1985 | Daniels |
| 4,597,080 A | * | 6/1986 | Thatte et al. |
| 5,067,129 A | * | 11/1991 | Evans et al. |
| 5,461,588 A | * | 10/1995 | Sardeson et al. |
| 5,533,192 A | | 7/1996 | Hawley et al. ............... 714/28 |
| 5,546,562 A | | 8/1996 | Patel ........................... 703/14 |
| 5,566,346 A | | 10/1996 | Andert et al. ................. 710/8 |
| 5,574,873 A | | 11/1996 | Davidian .................... 712/200 |
| 5,574,922 A | | 11/1996 | James ........................ 712/221 |
| 5,615,357 A | | 3/1997 | Ball ............................ 703/21 |
| 5,619,456 A | | 4/1997 | McClure ................. 365/189.05 |
| 5,623,617 A | | 4/1997 | Davidian .................... 712/227 |

* cited by examiner

Primary Examiner—Gopal C. Ray
(74) Attorney, Agent, or Firm—Richard A. Henkler; Leslie A. Van Leeuwen; Bracewell & Patterson, L.L.P.

(57) ABSTRACT

The method and system of the present invention provides for a test tool consisting of a Test nano Kernel and supported test programs (exercisers) which sequentially stage validity tests for central complex electronics hardware for architecture and hardware implementation for a single processor or in a multiprocessor system. Central electronics complex hardware is a processor, memory sub-system and system bridge coupled together and may include the input/output ports. Each stage becomes increasingly complex as the hardware platform becomes more stable. The Test nano Kernel consists of approximately 500 K of software code, provides multiprocessor support and implements context and 64-bit execution, effective equal to real and shared memory service, segment register attachment, gang scheduling and CPU affinity services. The Test nano Kernel provides for a smooth transition from simulation due to its capabilities to run simulation test cases on real hardware.

21 Claims, 4 Drawing Sheets

METHOD AND SYSTEM FOR LOW LEVEL TESTING OF CENTRAL ELECTRONICS COMPLEX HARDWARE USING TEST NANO KERNEL

BACKGROUND OF THE INVENTION

1. Technical Field

The present invention relates in general to computer information handling test systems and more particularly to techniques for computer hardware verification for a single processor or in multiprocessor ("MP") computer systems. Still more particularly, the present invention relates to sequentially testing for validity of a processor, memory sub-system, system bridge and input/output ports using a Test nano Kernel for architecture and hardware implementation.

2. Description of the Related Art

Most system designs having processors are represented by a model written in some hardware description language ("HDL") that can be later transformed into silicon. The pre-silicon model is extensively verified through simulation before it is fabricated ("taped-out"). Since the fabrication process is very expensive, it is necessary to keep the number of tape-outs to a minimum by exposing all bugs either in simulation or in early releases of the hardware. While software simulators are slow, they permit unrestricted use of checker probes into the model-under-test. As a result, any violation exposed during simulation can be detected via the probes. On the other hand, hardware exercise programs can run at a very high speed and thus increase test coverage but their checking abilities are limited to the data observed in the test case.

Therefore, the validation of multiprocessor ("MP") computer systems may be accomplished with the use of several tools and mechanisms utilizing hardware exercise programs. Referring to FIG. 1, one such validation cycle 10 is shown utilizing four tests to implicitly validate a multiprocessor system. These tests consist of a bring-up driver microcode 12, Hardware Test Exerciser (HTX) 14, firmware 16, and Operating Systems 18 (i.e. AIX) tests, as shown in FIG. 1. However, microcode 12, firmware 16 and operating systems 18 do not execute tests for the processor alone, but for the system. On the other hand hardware test exercisers 14 require that operating systems 18 be installed and operational prior to loading and execution because it runs on top of operating systems 18. Moreover, these hardware excercisers 14 tests run too late in the test cycle to be useful as a processor verification tool. By way of example, but not of limitation, HTX 14 and AIX 18 will be used throughout as types of hardware test exerciser and operating system.

Additionally, in some cases, the AIX 18 is not ready to implement certain hardware functions further limiting the HTX 14 capabilities and given the size of HTX 14 and AIX 18, HTX 14 is considered bulky for processor verification. Lastly, due to the complexity of porting AIX 14 and HTX 18, the software walks through the hardware before it gets to the primary task of the present invention, which is processor verification.

It would be desirable, therefore, to provide a method and system for a test tool that will stress and test a processor in a multiprocessor system very early in the development cycle. Additionally, it would be desirable for the test tool to run without the production operating system to reduce the dependency of the hardware on the operating system for hardware verification and vice versa. Furthermore, it would be desirable for the test tool to operate with or without I/O and memory requirements and be able to run from the cache alone. It would also be desirable to have an operating system with the ability to hand over the control to the test case and get it back in an orderly fashion without restricting the test case scope. The subject invention herein solves all of these problems in a new and unique manner which has not been part of the art previously.

SUMMARY OF THE INVENTION

It is therefore one object of the present invention to provide a method and a means for hardware verification for a single processor or multiprocessor systems.

It is another object of the present invention to provide a method and system that will stress and test a processor very early in a development cycle utilizing a very small amount of software code.

It is yet another object of the present invention to provide a method and system for a Test nano Kernel that may perform sequential validity tests for a processor, memory sub-system, system bridge and input/output ports.

The foregoing objects are achieved as is now described. The method and system of the present invention provides for a test tool consisting of a Test nano Kernel and supported test programs (exercisers) which sequentially stage stress or validity tests for the central complex electronics hardware for architecture and hardware implementation for a single processor or in a multiprocessor system. Central electronics complex hardware is a processor, memory sub-system and system bridge coupled together and may include the input/output ports. Each stage becomes increasing complex as the hardware platform becomes more stable. The Test nano Kernel requires approximately 500 K of memory or cache to operate, provides multi processor support and implements context and 64-bit execution, interrupt vector ownership, effective equal to real and shared memory service, segment register attachment, gang scheduling and CPU affinity services over and above the major subset of standard UNIX functions. The Test nano Kernel provides for a smooth transition from simulation due to its capabilities to run simulation test cases on real hardware.

The above as well as additional objects, features, and advantages of the present invention will become apparent in the following detailed written description. Kernel provides for a smooth transition from simulation due to its capabilities to run simulation test cases on real hardware.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 2:
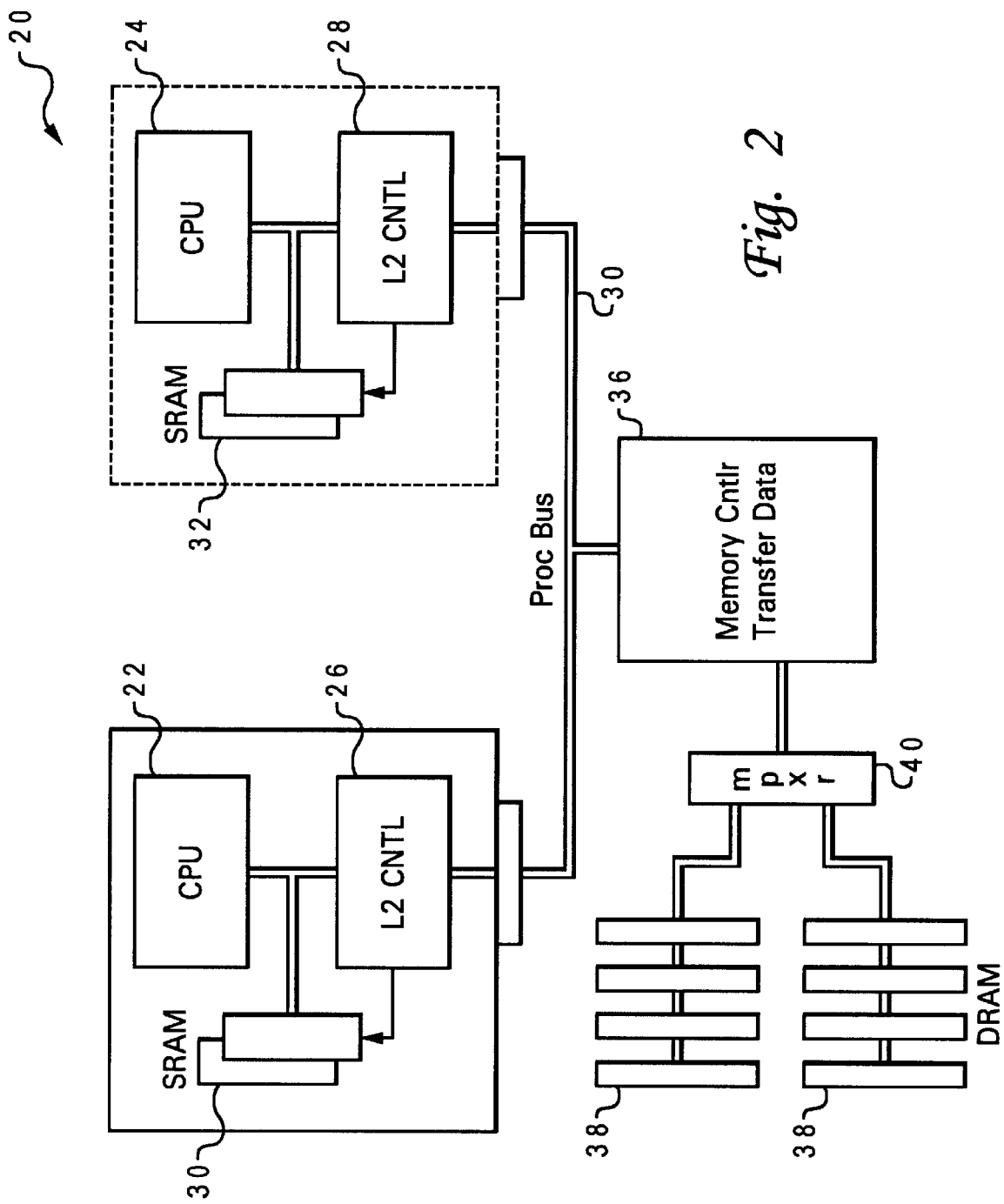
FIG. 2 is a block diagram of the test components within a multiprocessor system in accordance with a preferred embodiment of the present invention.

With reference now to the figures, and in particular with reference to FIG. 2, components of a multiprocessing or information-handling system in which a preferred embodiment of the present invention may be implemented is depicted. Multiprocessing or information handling system 20 is a symmetric multiprocessor (SMP) system including a plurality of processors 22 and 24, which preferably comprise one of the family of processors available from International Business Machines of Armonk, N.Y. Although only two processors are depicted in the exemplary embodiment, single or additional processors may be utilized. The invention is applicable to other systems besides SMP data processing systems, such as uniprocessor systems, NUMA architecture systems, LPAR cluster systems, and the like.

Each processor 22 and 24 has an associated level two (L2) cache 32 and 34, respectively, shown as static ram (SRAM) and L2 cache controllers 26 and 28 for staging data and instructions to the processors. Processors 22 and 24 maybe connected, through L2 cache controllers 26 and 28, to system or processing bus 30. The memory sub-system therefore consists of the L2 cache controllers 26 and 28 and their associated cache 32 and 34, respectively. The memory subsystem and processors, as shown in FIG. 2 are connected through processor bus 30 to System Bridge 36 for use in data transfers. The System Bridge 36 may be referred to as a memory controller and further stage data and instructions from main memory 38 or DRAM through multiplexer 40 to the processors 22 and 24. In accordance with the present invention, a processor 22, memory sub-system 26 and 30 and system bridge 36 coupled together are referred to as central electronics complex hardware.

Figure 1:
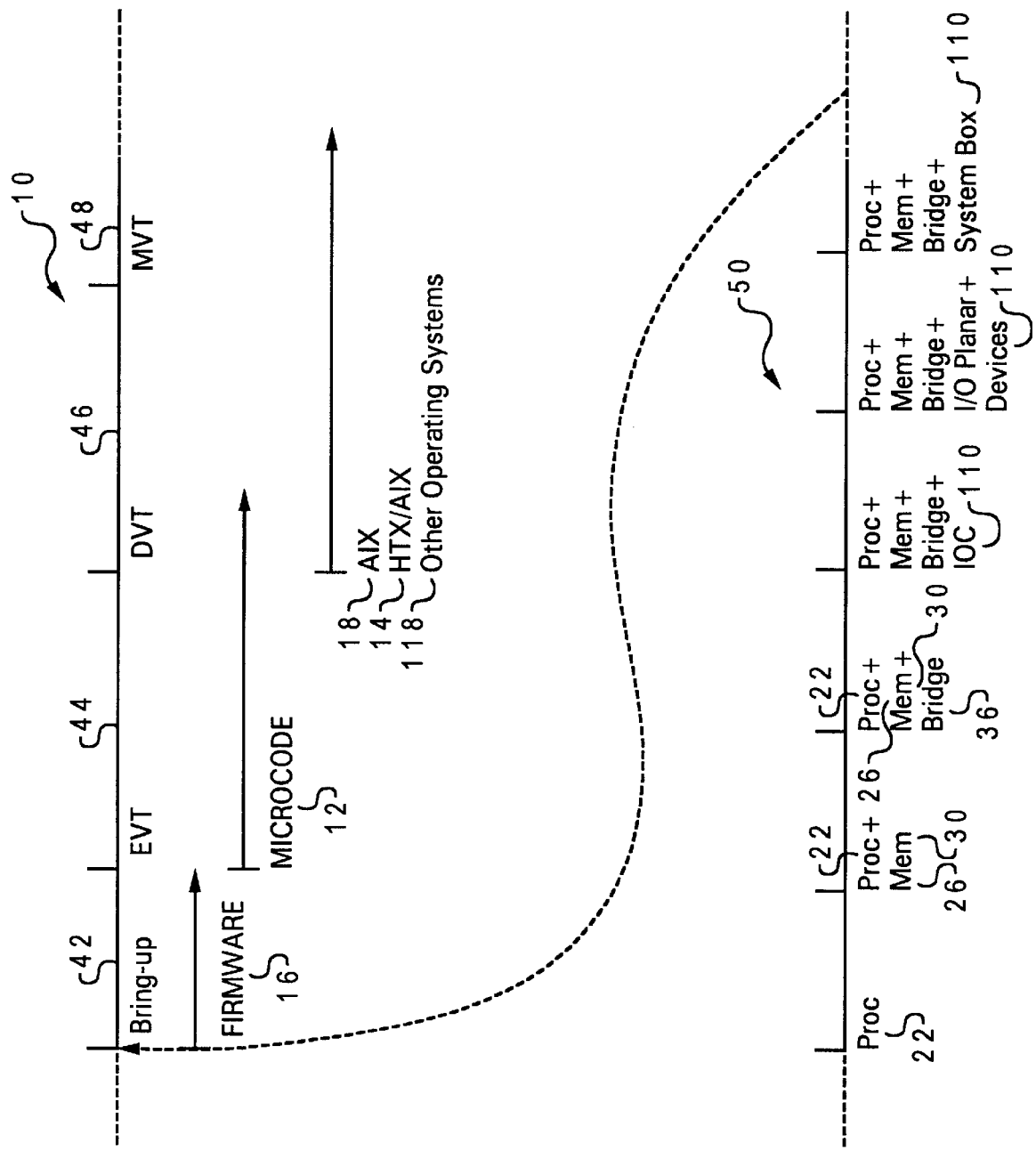
FIG. 1 depicts a validation cycle for a multiprocessor system in which a preferred embodiment of the present invention may be implemented.

Referring once again to FIG. 1, a typical build and validation cycle for a multiprocessing or information handling system consists of four phases, Bring-up 42, EVT 44 (Engineering Validation Test), DVT 46 (development Validation test) and MVT 48 (Manufacturing Validation Test). The average duration of the four test phases, as depicted in FIG. 1 are 4, 8, 8 and 4 weeks, respectively. As stated before and referring to the testing tools shown in FIG. 1, the BUD 12, firmware 16 and AIX 18 do not execute tests for the processor alone, but for the system. The HTX 14 requires that AIX 18 be installed and operational prior to loading and execution. Because HTX 14 runs on top of AIX 18, as shown in FIG. 1, runs during DVT 46 and MVT 48 are too late in the test cycle to be useful as a processor verification tool.

Figure 4:
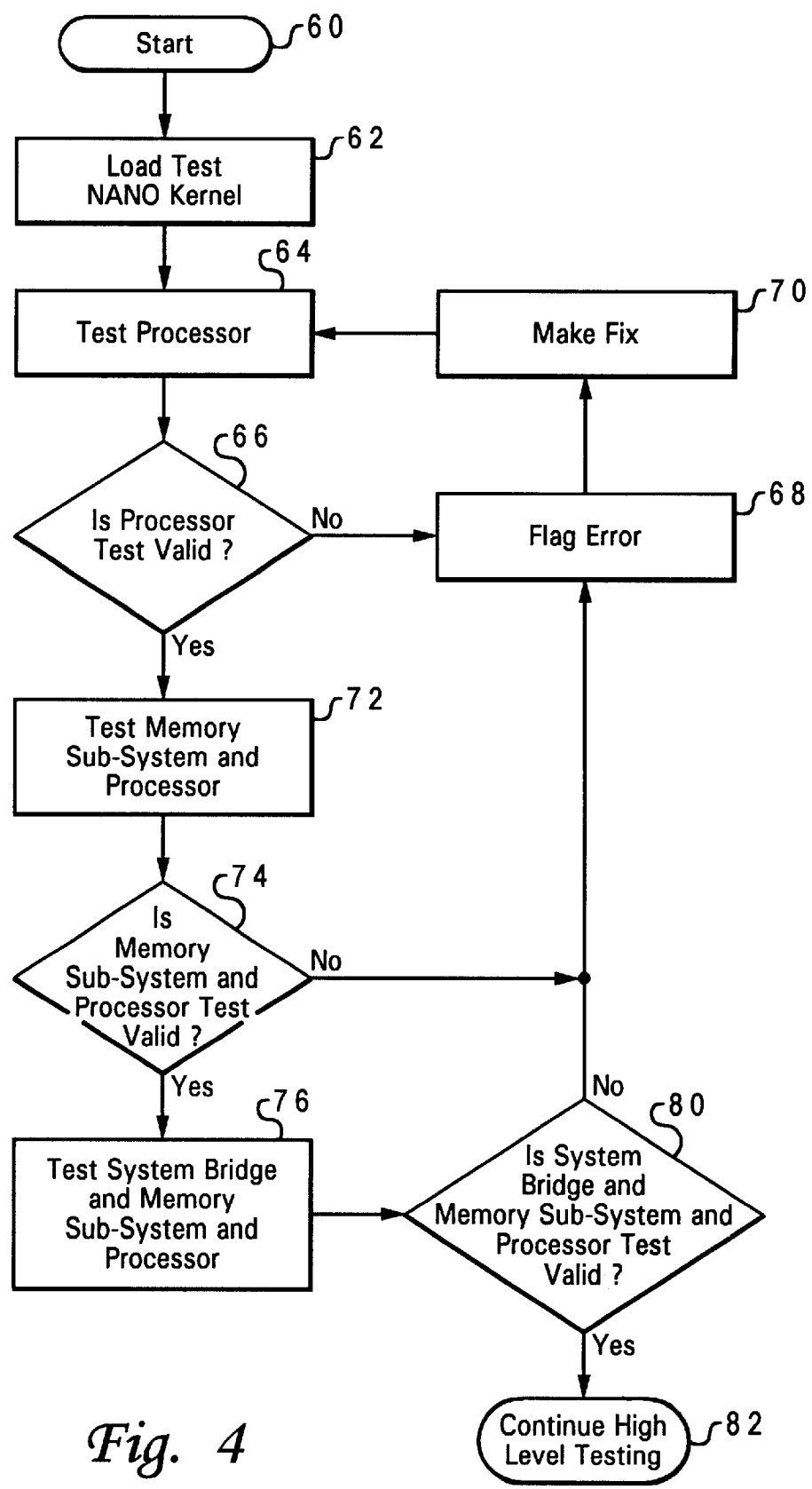
FIG. 4 depicts a high level flowchart for testing the components shown in FIG. 2.

Referring once again to FIG. 1, the method and system of the present invention provides for a test tool consisting of a Test nano Kernel and supported test programs (exercisers) which sequentially stage validity tests for the central complex electronics hardware for architecture and hardware implementation in a multiprocessor system. Additionally, it should be understood that the Test nano Kernel of the present invention is not limited to testing the central complex electronics hardware and may be expanded to test the input/output ports and beyond. As shown in FIG. 1, these staged tests 50 are performed very early in the validation cycle before the firmware 16 test is initiated during the Bring-up phase 42. Referring to FIG. 4 there is shown a high level flowchart for testing the central complex electronics hardware using the Test nano central complex electronics hardware using the Test nano Kernel in accordance with the preferred embodiment of the present invention.

Referring to both FIGS. 1 and 4, the method and the system for one type of application of the present invention will now be described. The method first starts at step 60 with loading the Test nano Kernel of the present invention into the multiprocessor system. For this type of application the minimum initialization of the processor and the memory sub-system are needed to load and run the Test nano Kernel from main memory. The loading of the Test nano Kernel into main memory may be accomplished by using an external JTAG kind of tools, or via a diskette after the system is initialized by the firmware, or the support processor. The process then proceeds to test by way of example, processor 22 for architecture and hardware implementation validity using the Test nano Kernel. If the validity test fails, an error is flagged at step 68. Once a fix is made at step 70, the process continues once again at step 64. When the architecture and hardware implementation is valid for the processor 22, the test is expanded to include the memory subsystem 26 and 30 coupled to the processor 22 and the test for architecture and hardware implementation validity for both components using the Test nano Kernel is performed as shown in step 72. If in step 74 the validity test fails, an error is flagged once again at step 68. Once a fix is made at step 70, the process continues once again at step 64. It should be noted that even though the fix is for the combination of the processor and the memory sub-system, the fix is checked starting with the processor.

When the architecture and hardware implementation is valid for the processor 22 and the coupled memory sub-system 26 and 30 in both steps 66 and 74, the process proceeds to step 76. As shown in step 76, the test for architecture and hardware implementation validity is now expanded to include testing the system bridge 36 coupled to the memory subsystem 26 and 30 and processor 22 wherein all components are tested using the Test nano Kernel. If the validity test fails as shown in step 80, an error is flagged once again at step 68. Once a fix is made at step 70, the process continues once again at step 64. As noted before, even though the fix is for the combination of the processor, memory sub-system and system bridge, the fix is checked starting with the processor. When the architecture and hardware implementation is valid in steps 66, 74 and 80 for the processor 22 coupled to the memory subsystem 26 and 30 coupled to system bridge 36, the process proceeds to step 82 wherein high level component testing commences and the method and system using the Test nano Kernel in accordance with the present invention is completed.

Figure 3:
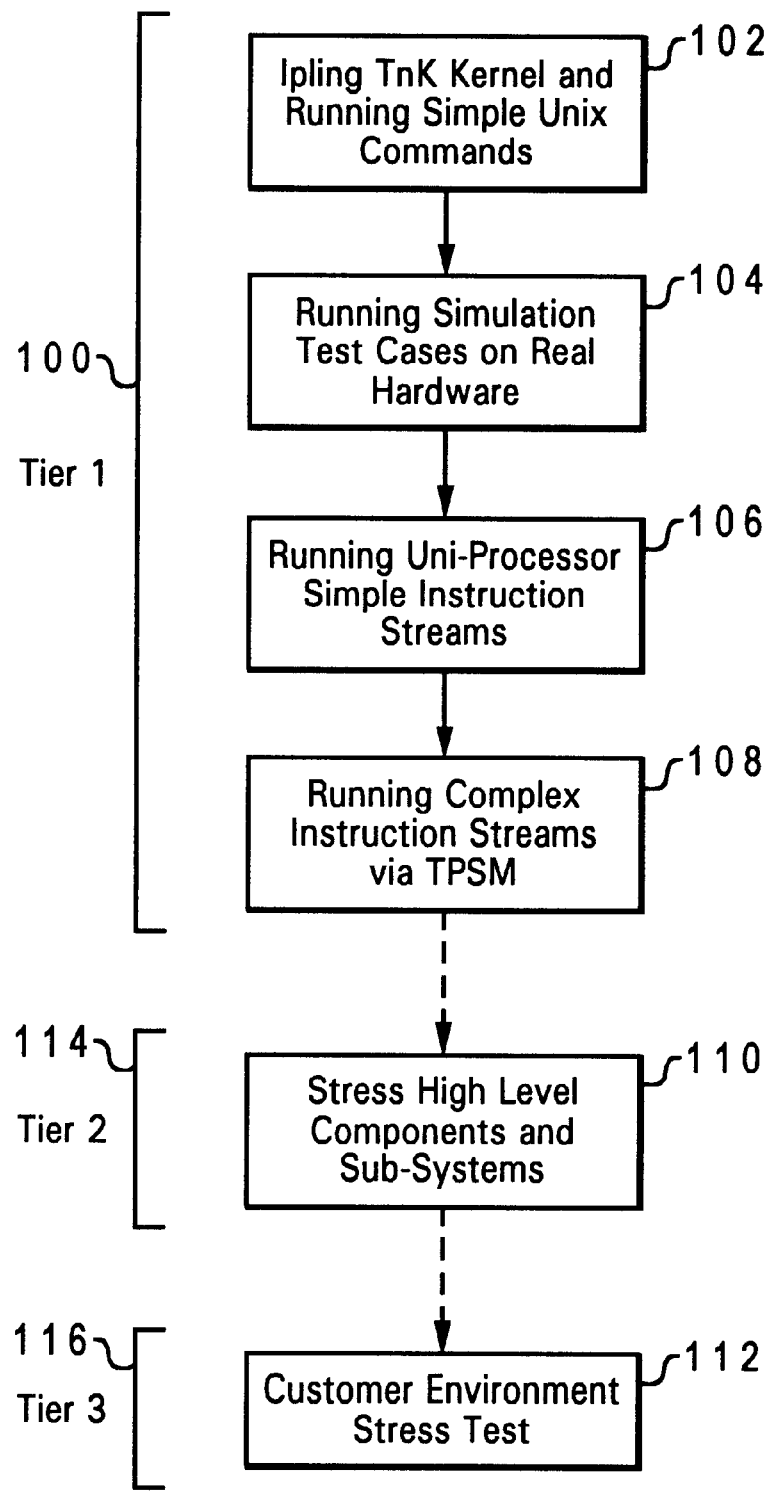
FIG. 3 depicts a high level flowchart for three tiers of a test process in system development in which one tier utilizes the Test nano Kernel of the present invention.

FIG. 3 depicts a high level flowchart for three tiers of a test process in system development in which one tier utilizes the Test nano Kernel of the present invention The first tier 100, is the low level, very early, stress test using the Test nano Kernel in accordance with the present invention. It consists of running simple Unix commands, as shown in block 102. The Test nano Kernel was developed using the Minix Operating System well known in the prior art as an initial base and was substantially modified to support Multi-Processors (MP) as a stress tool. Additionally, substantial amounts of code was added to the modified Minix code which allows the Test nano Kernel to run on symmetrical multiprocessor (SMP) systems as well as the afore-described additional services. It should be appreciated that the Test nano Kernel is multiprocessor safe and data integrity is not compromised due to timing or other related system situations. The code also allows interrupts to come to any processor in the system.

Referring once again to FIG. 3, the Test nano Kernel use support test programs (exercisers) when running simulation test cases on real hardware, as shown in block 104. The Test nano Kernel is enhanced to provide and implement context execution, vector ownership and 64-bit execution. Added code to the Test nano Kernel implements a set of services to allow a process to take control of a processor with minimal or no restrictions. This allows a program to execute any case with almost no restrictions. The interface has been designed with the assumption that the test programs are well behaved and will use only the resources granted to them. Additionally, the Test nano Kernel and context execution services were designed and implemented such that they allow test cases to run in 32 bit or 64-bit mode execution and to control interrupt vectors. The memory manager controls the whole memory space. The determination of 32 bit or 64 bit is all done at run time.

Turning once again to FIG. 3, block 106 shows the Test nano Kernel running uniprocessor simple instruction streams. This includes the enhanced ability of the Test nano Kernel by adding code to allow a process to get a contiguous available memory of any size such that its effective address is equal to its physical address. The memory request can be of any size or alignment (greater than a page). The memory request maybe made for a specific address where the allocation can be shared or private. This enhancement is referred to as effective equal to real memory allocation. The memory allocated by this enhancement can be attached to any available segment register of a process. This enables the process in virtual mode to access any memory available in the system. Also added to the Test nano Kernel is a process that allows a set of processes to be scheduled at the same time, referred to as gang scheduling. The Test nano Kernel synchronizes and dispatches the ganged-up processes when system resources become available. Also, an added set of services for CPU affinity was added to the Test nano Kernel code to allow a process to dictate and inquire the processors it wants to run. The Test nano Kernel code image is very small, approximately 500K. Also added were random generators of code and has the ability to generate random numbers.

Referring once again to FIG. 3, in block 108, there is another exerciser that runs on the Test nano Kernel that tests and stress the processor in a system environment. This exerciser in block 108 generates and runs pseudo random instruction streams. It creates contentions between the multiple processors on the system. The exerciser in block 108 stresses the coherence of the memory sub-system by issuing all memory access types, runs all caching and translation modes, implements true data sharing, synchronizes access to shared memory and supports atomic operations. The exerciser in block 108 verifies the processor architecture by executing all architected and supported instructions and comparing output to simulated results based on a processor model. Furthermore, this exerciser stresses the hardware by address aliasing, cache and table lookaside buffer (TLB) congruency and varying the timings. The seed based capabilities of for this exerciser allows reproducibility of tests and also provides good test coverage.

Referring now to FIGS. 1 and 3, the tier one process has been completed in accordance with the preferred embodiments of the present invention, more specifically, the Test nano Kernel and its associated exercisers. The validation cycle then proceeds to block 144 for tier two testing of higher level components and subsystems 100. After the completion of tier two testing the validation testing completes at tier three, the customer environment stress test, shown as block 116. The tier three customer environment test consists of hardware and the integrated production operating systems 118, bringing the validation testing to a closure.

It is also important to note that although the present invention has been described in the context of a fully functional method for low level testing of central electronics complex hardware, those skilled in the art will appreciate that the mechanisms of the present invention are capable of being distributed as a program product in a variety of forms to any type of information handling system, and that the present invention applies equally regardless of the particular type of signal bearing media utilized to actually carry out the distribution. Examples of signal bearing media include, without limitation, recordable type media such as floppy disk or CD ROMs and transmission type media such as analog or digital communications links.

As has been described, the present invention provides an improved method and system for a Test nano Kernel that is a very effective low level hardware stress tool with capabilities for very early hardware problem discovery and resolution. Because it runs on the hardware before IPL ROS and the production operating system are ready, the Test nano Kernel of the present invention encounters and potentially resolves hardware problems that are normally caught when firmware and the production operation system are running on the hardware. As such, the Test nano Kernel provides for easier and shorter bring up of the firmware and the production operation systems. Additionally, the Test nano Kernel is also an effective tool from an operating system perspective. By verifying the hardware prior to its integration with the production operating system, it makes it easier for the production operating system to be brought up on the hardware. It also helps eliminate hardware specific fixes in the production operating system and reduces the dependence of the production operating system on the hardware.

While the invention has been particularly shown and described with reference to a preferred embodiment, it will be understood by those skilled in the art that various changes in form and detail may be made therein without departing from the spirit and scope of the invention.

What is claimed is:

1. A method for low level testing of central electronics complex hardware, said method comprising the steps of:

testing a processor for architecture and hardware implementation validity using a Test nano Kernel;

responsive to determining that said architecture and hardware implementation is valid for said processor; expanding said testing to a memory subsystem coupled to said processor for architecture and hardware implementation validity using said Test nano Kernel;

responsive to determining that said architecture and hardware implementation is valid for said memory subsystem coupled to said processor; expanding said testing to a system bridge coupled to said memory subsystem and said processor for architecture and hardware implementation validity using said Test nano Kernel; and responsive to determining that said architecture and hardware implementation is valid for said system bridge coupled to said memory subsystem coupled to said processor; expanding said testing to high level components and sub-systems.

2. The method of claim 1, wherein testing for said processor for architecture and hardware implementation validity using said Test nano Kernel further comprises the step of:

flagging an error when said test is not valid and upon fixing said error retesting said processor for architecture and hardware implementation validity using said Test nano Kernel.

3. The method of claim 1, wherein expanding said testing to said memory subsystem coupled to said processor for architecture and hardware implementation validity using said Test nano Kernel further comprises the step of:

flagging an error when said test is not valid and upon fixing said error retesting said memory subsystem coupled to said processor beginning with said processor for architecture and hardware implementation validity using said Test nano Kernel.

4. The method of claim 1, wherein expanding said testing to said system bridge coupled to said memory subsystem and said processor for architecture and hardware implementation validity using said Test nano Kernel further comprises the step of:

flagging an error when said test is not valid and upon fixing said error retesting said system bridge coupled to said memory subsystem coupled to said processor beginning with said processor for architecture and hardware implementation validity using said Test nano Kernel.

5. The method according to claim 1, further comprising the step of:

implementing context execution when using said Test nano Kernel.

6. The method according to claim 1, further comprising the step of:

implementing interrupt vector ownership when using said Test nano Kernel.

7. The method according to claim 1, further comprising the step of:

implementing effective equal to real and shared memory service when using said Test nano Kernel.

8. The method according to claim 1, further comprising the step of:

implementing segment register attachment when using said Test nano Kernel.

9. The method according to claim 1, further comprising the step of:

implementing gang scheduling when using said Test nano Kernel.

10. The method according to claim 1, further comprising the step of:

implementing CPU affinity services when using said Test nano Kernel.

11. An information handling system, comprising:

means for testing a processor for architecture and hardware implementation validity using a Test nano Kernel;

means for expanding said validity testing to a memory subsystem coupled to said processor for architecture and hardware implementation using said Test nano Kernel after determining that said architecture and hardware implementation is valid;

means for expanding said testing to a system bridge coupled to said memory subsystem and said processor for architecture and hardware implementation validity using said Test nano Kernel after determining that said architecture and hardware implementation is valid for said memory subsystem coupled to said processor; and means for expanding said testing to high level components and sub-systems after determining that said architecture and hardware implementation is valid for said system bridge coupled to said memory subsystem coupled to said processor.

12. The information handling system according to claim 11, comprising:

means for flagging a fixing error when said test is not valid and means for retesting said processor for architecture and hardware implementation validity using said Test nano Kernel.

13. The information handling system according to claim 11, comprising:

means for flagging a fixing error when said test is not valid and means for retesting said memory subsystem coupled to said processor beginning with said processor for architecture and hardware implementation validity using said Test nano Kernel.

14. The information handling system according to claim 11, comprising:

means for flagging a fixing error when said test is not valid and means for retesting said system bridge coupled to said memory subsystem coupled to said processor beginning with said processor for architecture and hardware implementation validity using said Test nano Kernel.

15. The information handling system according to claim 11, comprising:

means for implementing context execution when using said Test nano Kernel.

16. The information handling system according to claim 11, comprising:

means for implementing 64-bit execution when using said Test nano Kernel.

17. The information handling system according to claim 11, comprising:

means for implementing effective equal to real and shared memory service when using said Test nano Kernel.

18. The information handling system according to claim 11, comprising:

means for implementing segment register attachment when using said Test nano Kernel.

19. The information handling system according to claim 11, comprising:

means for implementing gang scheduling when using said Test nano Kernel.

20. The information handling system according to claim 11, comprising:

means for implementing CPU affinity services when using said Test nano Kernel.

21. A computer program product, comprising:

instruction means for testing a processor for architecture and hardware implementation validity using a Test nano Kernel;

instruction means for expanding said validity testing to a memory subsystem coupled to said processor for architecture and hardware implementation using said Test nano Kernel after determining that said architecture and hardware implementation is valid;

instruction means for expanding said testing to a system bridge coupled to said memory subsystem and said processor for architecture and hardware implementation validity using said Test nano Kernel after determining that said architecture and hardware implementation is valid for said memory subsystem coupled to said processor; and instruction means for expanding said testing to high level components and sub-systems after determining that said architecture and hardware implementation is valid for said system bridge coupled to said memory subsystem coupled to said processor.

* * * * *